Figure 1:
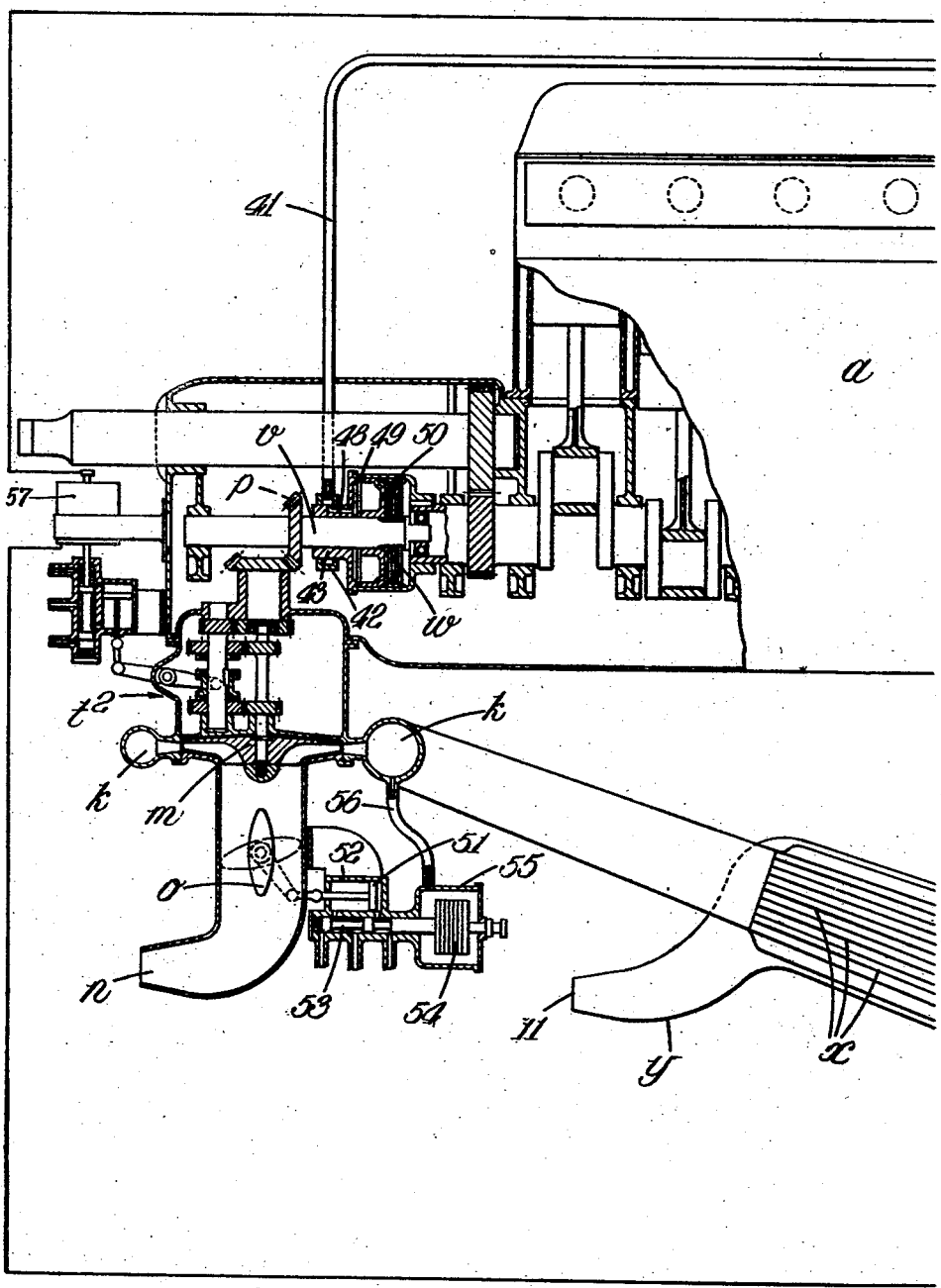

March 20, 1945.  A. G. FORSYTH ET AL  2,371,983
SUPERCHARGED ENGINE FOR AIRCRAFT
Filed Feb. 28, 1942  2 Sheets-Sheet 1

INVENTORS
ARCHIBALD GRAHAM FORSYTH,
GEORGE JAMES SMITH-PERT,
BY Robert B. Larson
ATTORNEY

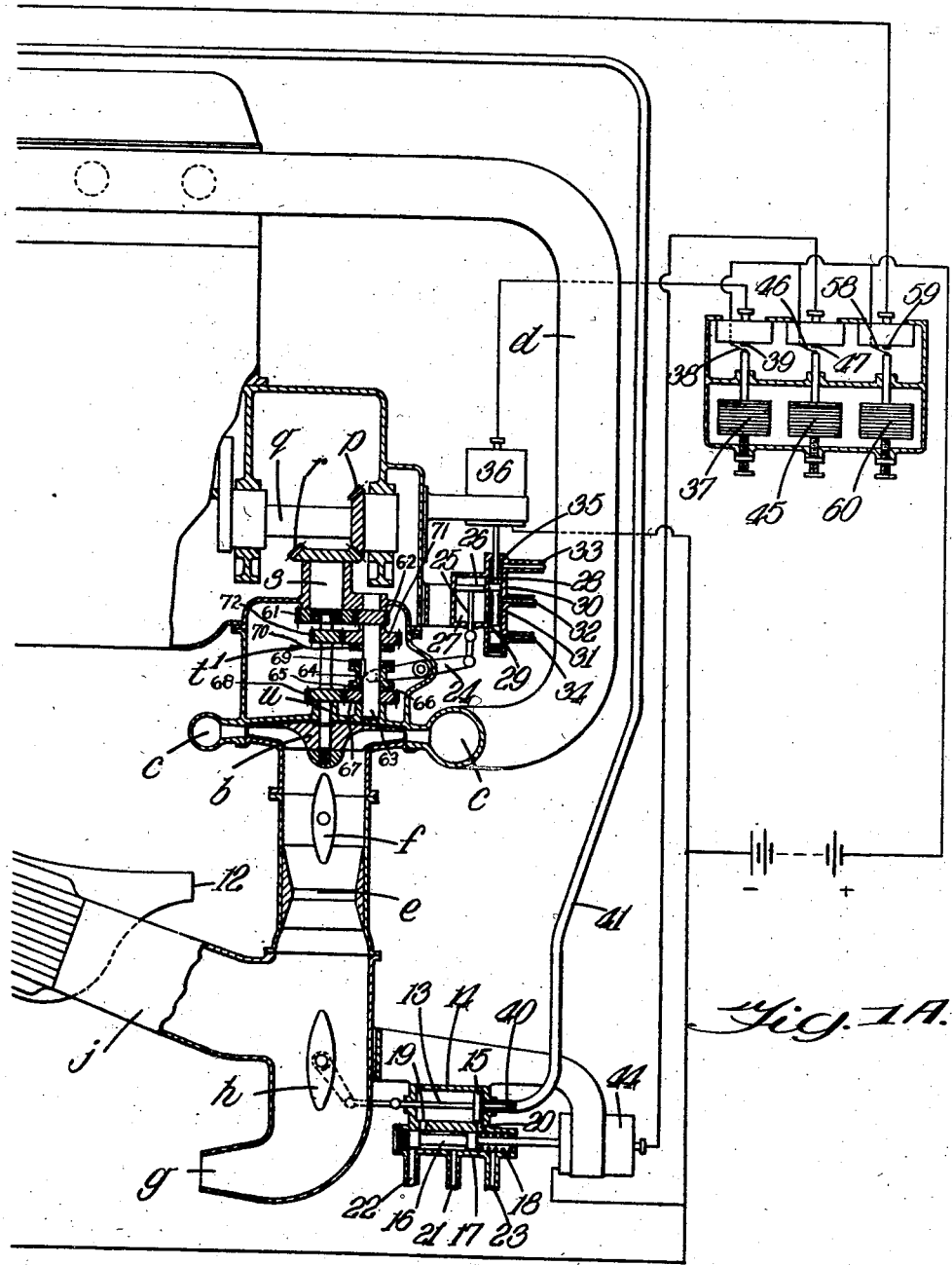

Patented Mar. 20, 1945

2,371,983

UNITED STATES PATENT OFFICE 2,371,983

SUPERCHARGED ENGINE FOR AIRCRAFT

Archibald Graham Forsyth and George James Smith-Pert, Cheam, England, assignors to The Fairey Aviation Company Limited, Hayes, Middlesex, England Application February 28, 1942, Serial No. 432,870
In Great Britain July 29, 1941

11 Claims. (Cl. 123—119)

It has been found that in raising the pressure of air by multi-stage compression for a supercharged aircraft engine, excessive heat is generated, and it is an object of the present invention to obviate, or at least to reduce, that disadvantage and to provide improved means for raising the air pressure by stages corresponding with the altitude at which the aircraft is flying and a further object is to initiate such changes automatically.

According to this invention an aircraft engine is provided, in addition to the usual supercharger at the rear of the engine, with a second supercharger at the front of the engine, the output from said second supercharger being led by a long pipe to the carburettor of the engine and thence to the inlet of the first or rear supercharger by which the charge is introduced into the engine in the known manner. The second supercharger may be mechanically driven by gearing or by an exhaust turbine using the engine exhaust.

The long pipe connection between the second supercharger and the carburettor affords ample opportunity for cooling the compressed air, and it may be formed with fins or may have other known cooling devices.

When the aircraft is flying at low altitudes only the first supercharger need be employed, and air inlets to the two superchargers may be provided with valves to control the flow according to requirements, the valves being operable concurrently with the establishment of driving power for the second supercharger.

Preferably both superchargers are driven through variable speed mechanisms, as for example, two-speed gear boxes at "moderate" or "full" speeds and for convenience it may be stated that the operation of the improved supercharging arrangements are preferably effected in four stages, as follows:

1st stage, take off with the first supercharger alone driven at "moderate" speed, 2nd stage, first supercharger alone driven at "full" speed, 3rd stage, first supercharger driven at "full" speed and second supercharger at "moderate" speed, 4th stage, both superchargers driven at "full" speed.

It is to be understood that during the first and second stages the valve in the air inlet of the first supercharger is open and that of the second supercharger is closed, further that between the second and third stages the positions of these valves are reversed in synchronism with the gear engagement of the second supercharger.

Preferably the position of the valve in the air inlet of the first supercharger is controlled hydraulically and may be actuated concurrently with the gearing of the second supercharger as well as by automatic means dependent on the pressure of the atmosphere in which the machine is flying, while the position of the valve in the air inlet of the second superchanger is controlled by the pressure obtaining in the long pipe connection between the second supercharger and the carburettor, so that at whatever stage the arrangement may be working the pressure in the long pipe remains substantially constant.

The automatic working of the arrangement through the four stages when the aircraft is climbing or vice versa may be initiated by three barometric capsules arranged to actuate three electric switches at predetermined pressures corresponding with predetermined altitudes, so that the change from one stage to another is effected at such altitudes, the switches being included in electric circuits, for example, the circuits of solenoids for moving piston valves for controlling the flow of fluid pressure to and from hydraulic cylinders for actuating (a) the valve in the air inlet to the first supercharger (b) the clutch and gear change mechanism of the first supercharger and (c) the clutch and gear change mechanism of the second supercharger.

The invention is illustrated by way of example in the accompanying drawings in which Figures 1 and 1A, when taken together, comprise a diagrammatic sectional side elevation of an aircraft engine having two superchargers arranged in accordance with the invention.

$a$ is an aircraft engine having at the rear end thereof a supercharger rotor $b$ working in conjunction with a manifold $c$ which delivers gaseous mixture to the engine $a$ by way of an inlet pipe $d$, the rotor $b$ drawing in air through a carburettor of which only the Venturi-tube $e$ and throttle valve $f$ are shown. For the sake of convenience hereinafter the carburettor will be referred to as $e$ although that is only the Venturi-tube thereof.

The carburettor $e$ has an air inlet $g$ which may be closed by a valve $h$ and it is also in communication with a long pipe $j$ which leads from the manifold $k$ of a second supercharger at the front of the engine $a$ and having a rotor $m$. The second supercharger $km$ also has an air inlet $n$ which may be closed by a valve $o$, the arrangement being such that the output of the second supercharger $km$ may be led by way of the long pipe $j$ to the carburettor e and thence to the inlet of the supercharger bc by which it is introduced into the engine a by way of the inlet pipe d.

As illustrated the rotor b of the supercharger bc is driven by a bevel gear wheel p on the crank shaft q of the engine a meshing with a bevel gear wheel r on a shaft s which is the driving shaft of a two-speed gearbox indicated generally as $t^1$ and on the driven shaft u of which the rotor b is mounted. The rotor m of the supercharger km is similarly driven through a two-speed gear box $t^2$ except that its bevel gear wheel p instead of being mounted directly on the crank shaft q is mounted on a subsidiary shaft v which may be connected with, and disconnected from, the crank shaft q by a clutch w.

For cooling purposes the long pipe j is formed with fins x . . . enclosed in a casing y having an air inlet 11 at its front end and projecting forwardly into the air stream and an outlet 12 projecting rearwardly into the air stream from its rear end.

The valve h for the air inlet g is controlled hydraulically and is actuated concurrently with the clutch w of the second supercharger km as well as by automatic means dependent on the pressure of the atmosphere in which the machine is flying. For this purpose the valve h has on its spindle an arm connected by a link with the piston rod 13 of an hydraulic cylinder 14, the double acting piston 15 of which is controlled by a piston valve 16 which is movable in a valve chamber 17 and is influenced by a spring 18. The cylinder 14 has at its opposite ends ports 19 and 20 communicating with the valve chamber 17 and the latter has a central pressure port 21 and two exhaust ports 22, 23 near its ends, the piston valve 16 having two heads separated by an annular groove so that the pressure port 21 may be put into communication with either of the ports 19 and 20. Normally the piston valve 16 is influenced to establish communication between the pressure port 21 and the port 19 so that the valve h is maintained in its open position; that is, the piston 15 is influenced to the right as shown in the drawings.

With respect to the two-speed gear $t^1$ for the supercharger bc it will be observed that a dog clutch is actuated by a lever 24 connected by a link with the piston rod 25 of a piston 26 in an hydraulic cylinder 27, the dog clutch enabling the crank shaft q to drive the supercharger bc in "moderate" or "full" gear alternatively, and, normally, effecting "moderate" gear drive. It should be manifest that the crank shaft q drives the bevel gear r which rotates the shaft s. A gear 61 on the lower end of this shaft s meshes with the gear 62 on the shaft 63 on which the dog clutch 64 slides, which dog clutch is moved upwardly or downwardly by the lever 24. The dog clutch is keyed to the shaft 63 so as to rotate therewith. When the lever 24 is moved upwardly, the dog clutch will slide upwardly on the shaft, and the dogs 65 thereon will engage dogs 66 on the lower gear 67 on the shaft 63 (which gear 67 ordinarily rotates freely with respect to the shaft 63) and thus causes this gear 67 to rotate with the shaft 63. The gear 67 meshes with a gear 68 on the shaft u, which shaft is a freely rotatable shaft and the lower end of which carries the rotor b. Thus, the rotor is driven at a low or moderate speed.

On the other hand, when the lever 24 is moved downwardly the dog clutch 64 will slide upwardly on its shaft 63, and the dogs 69 will eventually engage dogs 70 on the upper gear 71 (normally freely rotatable on the shaft). This causes the upper gear 71 to rotate with the shaft 63. The upper gear 71 meshes with a gear 72 on the upper end of the upper shaft u, and consequently the shaft u will rotate at a higher rate of speed.

When the lever 24 is disposed intermediately between the upper and lower gears on its shaft, then the crank shaft q consequently will not drive the rotor at all, since the dogs on the dog clutch do not engage either of the gear wheels of the gears.

The piston 26 in the cylinder 27 is double-acting for which purpose said cylinder has at its opposite ends ports 28 and 29 communicating with a valve chamber 30 in which is a piston valve 31 having two heads separated by an annular groove, the distance between said heads being substantially the same as that between the ports 28 and 29, while the valve chamber 30 has a centrally disposed pressure port 32 and exhaust ports 33 and 34 near its opposite ends, the arrangement being such that, according to the position of the piston valve 31, hydraulic pressure is admitted to the one end of the cylinder 27 and the other end thereof is open to exhaust. The piston valve 31 is influenced downwardly by a spring 35 so that normally hydraulic presure is admitted to the cylinder 26 via the pressure port 32, the valve chamber 30, and the port 29, so that the piston 26 is forced upwardly and acting on the lever 24 engages "moderate" gear.

In order to engage "full" gear for driving the supercharger bc the rod of the piston valve 31 is forced upwardly against the action of its spring 35 when a solenoid 36 is energized at a predetermined barometric pressure corresponding with a predetermined altitude by a barometric capsule 37 acting on the movable member 38 of an electric switch 38, 39.

In consequence of this arrangement the supercharger bc is driven at "moderate" speed until the aircraft attains a predetermined altitude (within a reasonable margin depending on the general prevailing barometric pressure) whereupon the gearing in the gearbox $t^1$ is changed to "full" gear automatically as a result of the closing of the switch 38, 39 by the barometric capsule 37.

At the right hand end of the cylinder 14 is a port 40 which communicates by way of a pipe 41 with a channel-section ring 42 surrounding a boss 43 on the casing of the clutch w by which the crank shaft q of the engine may be connected with, and disconnected from, the gearing for driving the supercharger km.

When the piston valve 16 is moved to the right in the drawings, as a result of the energization of a solenoid 44, the pressure port 21 is placed in communication with the cylinder 14, via the valve chamber 17 and port 20 and hydraulic pressure is admitted to the cylinder to act on its piston 15 to move it to the left in the drawings to close the valve h in the air inlet g to the carburettor e, the port 19 being placed in communication with the exhaust port 22. When the solenoid 44 is de-energized the piston valve 16 is returned to its normal position by its spring 18 thus putting the port 19 into communication with the pressure port 21, and the port 20 into communication with the exhaust port 23 and opening the valve h. The solenoid 44 is energized at a predetermined barometric pressure corresponding with a predetermined altitude by a barometric capsule 45 acting on the movable member 46 of an electric switch 46, 47.

At the same time as the valve $h$ is closed as above described the hydraulic pressure admitted to the cylinder 14 is admitted also via the pipe 41 and channel section ring 42 to passages such as 48 in the boss 43 and thence to a cylinder 49 in the clutch $w$ where it acts on a piston 50 to compress the plates of the clutch $w$ and thus establish driving connection between the crank shaft $q$ and the gearing for driving the supercharger $km$.

The gearing in the gearbox $t^2$ for the supercharger $km$ is similar to that in the gearbox $t^1$ for the supercharger $bc$ and, normally, is in mesh to transmit the drive to the supercharger $km$ at "moderate" speed as soon as the clutch $w$ is actuated to connect the subsidiary shaft $v$ with the crank shaft $q$.

The valve $o$ for the air-inlet $n$ is normally open and is controlled by hydraulic pressure acting on a double-acting piston 51 in a cylinder 52 similar to the double-acting piston 26 and cylinder 27 which control the gearbox $t^1$ for the supercharger $bc$, but the piston valve 53 for controlling the flow of hydraulic pressure to the cylinder 52 is actuated by a barometric capsule 54 in a chamber 55 which communicates by a pipe 56 with the manifold $k$ of the supercharger $km$ so that when the supercharger is driven, the pressure in its manifold $k$, and hence in the chamber 55, acting on the capsule 54, brings about the closing of the valve $o$ if the pressure in the manifold $k$ exceeds a predetermined value for which the capsule 54 is set.

In consequence of this arrangement the drive for the supercharger $bc$ having been first at "moderate" speed and then changed to "full" speed as above described, is maintained at "full" speed until the aircraft attains a predetermined higher altitude whereupon the switch 46, 47 is closed by the barometric capsule 45, the solenoid 44 is energized, hydraulic pressure acts on the piston 15 to close the valve $h$ and on the piston 50 in the cylinder 49 and acting on the plates of the clutch $w$ connects the crank shaft $q$ with the gearbox $t^2$ of the supercharger $km$ and causes the latter to be driven at "moderate" speed, its output being delivered via the long pipe $j$ (during its passage through which it is cooled) to the carburettor $e$ and thence to the supercharger $bc$ by which the pressure of the gaseous fuel is raised further before being delivered to the engine $a$ via the pipe $d$. If at any time the pressure in the manifold $k$ exceeds a predetermined value the capsule 54 acts to bring about the closing of the valve $o$ thus reducing the input, and therefore the output of the supercharger $km$ and tending to maintain said pressure constant.

The gearing in the gearbox $t^2$ for the supercharger $km$ and the manner in which it is controlled corresponds with that for the supercharger $bc$, and, therefore, need not be described in detail, but the circuit of the solenoid 57 for actuating its piston valve is controlled by an electric switch 58, 59, the movable member 58 of which is actuated by a third barometric capsule 60 which closes the switch 58, 59 when the aircraft climbs to a still higher predetermined altitude where the drop in barometric pressure to a predetermined value acts on said capsule 60 with the result that the gearing in the gearbox $t^2$ of the supercharger $km$ is changed automatically to drive the supercharger at "full" speed, thus increasing further the pressure of the input to the supercharger $bc$.

As the aircraft descends to levels where the predetermined barometric pressures obtain the switches 58, 59, then 46, 47 and then 38, 39 open successively as a result of which the sequence of stages of the supercharger drive are reversed, the piston valves of the double acting pistons being restored to their normal positions in which they permit the exhaust of the hydraulic pressure which has moved the pistons to their abnormal positions and admit hydraulic pressure to act on the pistons to maintain them in their normal positions.

It is to be understood that when the variable speed mechanisms for driving the superchargers provide for more than two speeds, the components for effecting control and the stages in which the operation is effected will be varied correspondingly.

We claim:

1. A supercharged aircraft engine having a supercharger disposed at the rear of said engine, a second supercharger disposed at the front of said engine, an inlet to, and an outlet from, each of said superchargers, a valve in each of said inlets, the outlet from the second mentioned supercharger being connected with the inlet to the first mentioned supercharger and the outlet from the first mentioned supercharger being connected with said engine, means for driving said superchargers, and controlling means for each of said driving means, said controlling means being adapted to connect first said first mentioned supercharger with said engine and then to connect both said superchargers with said engine, and said controlling means being adapted to close the valve in the inlet to the first mentioned supercharger concurrently with the connection of the second mentioned supercharger with said engine.

2. A supercharged aircraft engine having a supercharger disposed at the rear of said engine, a second supercharger disposed at the front of said engine, an inlet to, and an outlet from, each of said superchargers, the outlet from the second mentioned supercharger being connected with the inlet to the first mentioned supercharger and the outlet from the first mentioned supercharger being connected with said engine, means for driving said superchargers through appropriate two-speed gear boxes and controlling means for each of said two-speed gear boxes, said controlling means being adapted to connect first said first mentioned supercharger with said engine through the moderate gear of its appropriate two-speed gear box, then to change said connection to the full speed gear in said gear box, then, whilst maintaining said last mentioned connection, first to connect said second mentioned supercharger with said engine through the moderate gear of its appropriate two-speed gear box and finally to change said connection to the full speed gear in the two-speed gear box of said second supercharger.

3. A supercharged aircraft engine as claimed in claim 1, wherein the valve in the inlet to the first supercharger is normally open and is provided with means for closing it automatically when the aircraft attains an altitude where a predetermined atmospheric pressure prevails, said valve closing means comprising a solenoid arranged in an electric circuit and adapted to bring about movement of said valve, a switch in said electric circuit, and a barometric capsule adapted to close and open said switch as said capsule expands and contracts.

4. A supercharged aircraft engine as claimed in claim 1, wherein the opening and closing of the valve in the inlet to the second supercharger is controlled automatically by a barometric capsule subjected to the atmospheric pressure in the outlet from said second mentioned supercharger.

5. A supercharged aircraft engine as claimed in claim 1, wherein the valve in the inlet to the first supercharger is normally open and is provided with means for closing it automatically when the aircraft attains an altitude where a predetermined atmospheric pressure prevails, said valve closing means comprising an hydraulic device controlled by a solenoid arranged in an electric circuit and adapted to control said hydraulic device, a switch in said electric circuit, and a barometric capsule adapted to close and open said switch as said capsule expands and contracts.

6. A supercharged aircraft engine as claimed in claim 1, wherein the valve in the inlet to the first supercharger is normally open and is provided with means for closing it automatically when the aircraft attains an altitude where a predetermined atmospheric pressure prevails, said valve closing means comprising an hydraulic cylinder adapted to be connected with a source of fluid pressure and with exhaust, a piston in said cylinder connected with said valve, a piston valve working in a valve chamber and adapted to control the flow of fluid pressure to and from said hydraulic cylinder, a solenoid arranged in an electric circuit and adapted to bring about movement of said piston valve, a switch in said electric circuit, and a barometric capsule adapted to close and open said switch as said capsule expands and contracts.

7. A supercharged aircraft engine as claimed in claim 1, wherein the valve in the inlet to the first supercharger is normally open and is provided with means for closing it automatically when the aircraft attains an altitude where a predetermined atmospheric pressure prevails, said valve closing means comprising an hydraulic cylinder adapted to be connected with a source of fluid pressure and with exhaust, a piston in said cylinder connected with said valve, a piston valve working in a valve chamber and adapted to control the flow of fluid pressure to and from said hydraulic cylinder, a solenoid arranged in an electric circuit and adapted to bring about movement of said piston valve, a switch in said electric circuit, and a barometric capsule adapted to close and open said switch as said capsule expands and contracts, said piston valve being spring influenced whereby, when the circuit of its solenoid is broken said piston valve is moved into position to permit the hydraulic pressure to act on the valve in the inlet to the first mentioned supercharger to maintain it in its normal open position.

8. A supercharged aircraft engine as claimed in claim 1, wherein the valve in the inlet to the first supercharger is normally open and is provided with means for closing it automatically when the aircraft attains an altitude where a predetermined atmospheric pressure prevails, said valve closing means comprising an hydraulic cylinder adapted to be connected with a source of fluid pressure and with exhaust, a piston in said cylinder connected with said valve, a piston valve working in a valve chamber and adapted to control the flow of fluid pressure to and from said hydraulic cylinder, a solenoid arranged in an electric circuit and adapted to bring about movement of said piston valve, a switch in said electric circuit, and a barometric capsule adapted to close and open said switch as said capsule expands and contracts, said piston valve being spring influenced whereby, when the circuit of its solenoid is broken said piston valve is moved into position to permit the hydraulic pressure to act on the valve in the inlet to the first mentioned supercharger to maintain it in its normal open position, a clutch in the driving means for said second supercharger, a single-acting piston in an hydraulic cylinder, said single-acting piston being adapted to act on said clutch, the hydraulic cylinder of said single-acting piston being connected with one end of the first mentioned hydraulic cylinder whereby pressure serving to close the valve in the inlet to the first supercharger serves also to actuate said clutch to connect said second supercharger with said engine.

9. A supercharged aircraft engine as claimed in claim 2, wherein each two-speed gear box is operated by a double-acting piston in an hydraulic cylinder adapted to be connected with a source of fluid pressure and with exhaust, a piston valve working in a valve chamber and adapted to control the flow of fluid pressure to and from said hydraulic cylinder, a solenoid arranged in an electric circuit and adapted to bring about movement of said piston valve, a switch in said electric circuit, and a barometric capsule adapted to close and open said switch as said capsule expands and contracts.

10. A supercharged aircraft engine as claimed in claim 2, wherein each two-speed gear box is operated by a double-acting piston in an hydraulic cylinder adapted to be connected with a source of fluid pressure and with exhaust, a piston valve working in a valve chamber and adapted to control the flow of fluid pressure to and from said hydraulic cylinder, a solenoid arranged in an electric circuit and adapted to bring about movement of said piston valve, a switch in said electric circuit, and a barometric capsule adapted to close and open said switch as said capsule expands and contracts, said piston valve being spring influenced whereby when the circuit of its solenoid is broken said piston valve is moved into position to permit the hydraulic pressure to act on the two-speed gear to connect the appropriate supercharger with the engine through the moderate gear.

11. A supercharged aircraft engine having a supercharger disposed at the rear of said engine, a second supercharger disposed at the front of said engine, an inlet to, and an outlet from, each of said superchargers, the outlet from the second mentioned supercharger being connected with the inlet to the first mentioned supercharger by way of a long pipe provided with means adapted to cool the air passing through said pipe, and the outlet from the first mentioned supercharger being connected with said engine, a valve in each of said inlets, driving means for connecting said superchargers with said engine, said driving means including a two-speed gear box for each supercharger and an hydraulically actuated clutch for connecting said second mentioned supercharger with said engine, controlling means for each of said driving means, said controlling means comprising an hydraulic device which is, in turn, controlled by a solenoid arranged in an electric circuit, a switch in said electric circuit, and a barometric capsule adapted to close and open said switch as said capsule expands and contracts, the valve in the inlet to the first mentioned supercharger being normally open and being connected with an hydraulic device which is, in turn, controlled by a solenoid arranged in an electric circuit, a switch in the last mentioned electric circuit and a barometric capsule adapted to close and open said switch as said capsule expands and contracts, a connection between the last mentioned hydraulic device and said hydraulically actuated clutch whereby said clutch is actuated when fluid under pressure is admitted to said last mentioned hydraulic device to close the valve in the inlet to the first mentioned supercharger, the valve in the inlet to the second mentioned supercharger being connected with an hydraulic device which is, in turn, controlled by a barometric capsule subjected to the atmospheric pressure in the outlet from said second mentioned supercharger and adapted to bring about the closing and opening of the valve in the inlet to the second mentioned supercharger as said capsule contracts and expands, each of said hydraulic devices comprising a double-acting piston in an hydraulic cylinder adapted to be connected with a source of fluid pressure and with exhaust, a piston valve working in a valve chamber and adapted to control the flow of fluid under pressure to and from said hydraulic cylinder, said piston valve being spring influenced normally to a position in which it permits the hydraulic pressure to act on the appropriate double-acting piston to cause said double-acting piston to move the part with which it is connected to its normal position and said piston valve being connected with its appropriate solenoid, the barometric capsules associated with said hydraulic devices, with the exception of that barometric capsule which controls the valve in the inlet to the second mentioned supercharger, serving to close and open their appropriate electric switches successively at predetermined atmospheric pressures, the first mentioned supercharger alone being first driven at moderate speed, then its gear is changed to full speed, then the valve in its inlet is closed, its driving connection at full speed is maintained, the hydraulically operated clutch in the driving means of the second mentioned supercharger is actuated to connect said second mentioned supercharger with said engine to drive said second mentioned supercharger at moderate speed, the outlet from said second mentioned supercharger being connected with the inlet to said first mentioned supercharger by said long pipe, and finally, whilst said first mentioned supercharger is driven at full speed the gear of the driving means for said second mentioned supercharger is changed to drive said second mentioned supercharger at full speed, said sequence of stages taking place in an inverse sense as said electric switches are opened successively.

ARCHIBALD GRAHAM FORSYTH.
GEORGE JAMES SMITH-PERT.